United States Patent
Baumann et al.

(10) Patent No.: US 6,688,697 B2
(45) Date of Patent: Feb. 10, 2004

(54) HEAD RESTRAINT

(75) Inventors: Karl-Heinz Baumann, Bondorf (DE); Rainer Justen, Altdorf (DE); Ulrich Lasi, Weil im Schoenbuch (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/962,457

(22) Filed: Sep. 26, 2001

(65) Prior Publication Data

US 2003/0057758 A1 Mar. 27, 2003

(30) Foreign Application Priority Data

Sep. 26, 2000 (DE) .......................... 100 47 406

(51) Int. Cl.$^7$ .................. B60N 2/427; B60R 21/00; B60R 22/28; A47C 7/38
(52) U.S. Cl. ............... 297/391; 297/408; 297/409; 297/216.12
(58) Field of Search .............. 297/216.12, 408, 297/409, 404, 391

(56) References Cited

U.S. PATENT DOCUMENTS

| | | | | |
|---|---|---|---|---|
| 4,304,439 A | * | 12/1981 | Terada et al. | 297/409 |
| 4,674,797 A | * | 6/1987 | Tateyama | 297/408 |
| 4,693,515 A | * | 9/1987 | Russo et al. | 297/408 X |
| 5,052,754 A | * | 10/1991 | Chinomi | 297/408 |
| 5,290,091 A | * | 3/1994 | Dellanno et al. | 297/216.12 X |
| 5,882,071 A | * | 3/1999 | Fohl | 297/216.12 |
| 6,045,181 A | * | 4/2000 | Ikeda et al. | 297/216.12 |
| 6,079,776 A | * | 6/2000 | Breitner et al. | 297/216.12 |
| 6,082,817 A | | 7/2000 | Muller | 297/216.12 |
| 6,126,238 A | * | 10/2000 | Klindworth | 297/216.12 X |
| 6,352,285 B1 | * | 3/2002 | Schulte et al. | 297/216.12 X |
| 6,511,130 B2 | * | 1/2003 | Dinkel et al. | 297/408 |

FOREIGN PATENT DOCUMENTS

| | | |
|---|---|---|
| DE | 39 00 495 A1 | 7/1990 |
| DE | 19707998 | 9/1998 |
| DE | 299 07 245 U1 | 9/1999 |

* cited by examiner

Primary Examiner—Rodney B. White
(74) Attorney, Agent, or Firm—Crowell & Moring LLP

(57) ABSTRACT

A head restraint for a motor vehicle has a fixed support part and a movable, prestressed part. The parts are connected to each other via at least one upper and one lower lever, in which case the movable part can be moved from a normal position into a protective position and vice versa. The movable head-restraint part can be shifted forwards in a simple manner in that the levers are arranged parallel to each other. In order to prestress the movable part at least one spring is provided that engages at its one end on the fixed support part and at its other end directly or indirectly on one of the two levers.

33 Claims, 3 Drawing Sheets

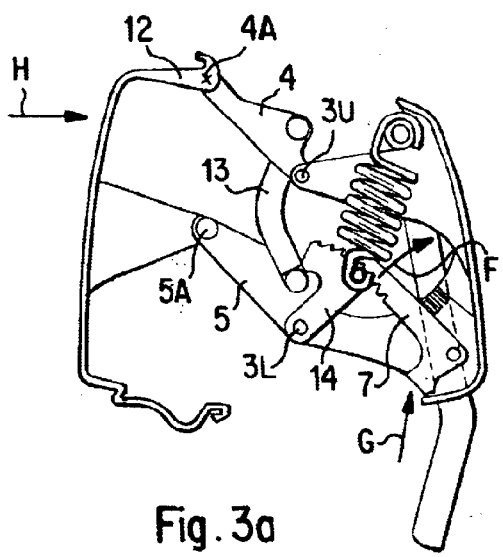
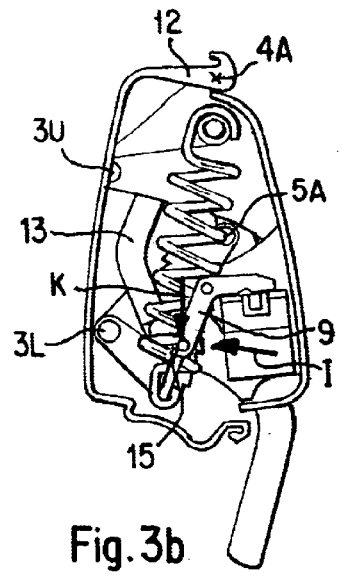
Fig. 3a    Fig. 3b
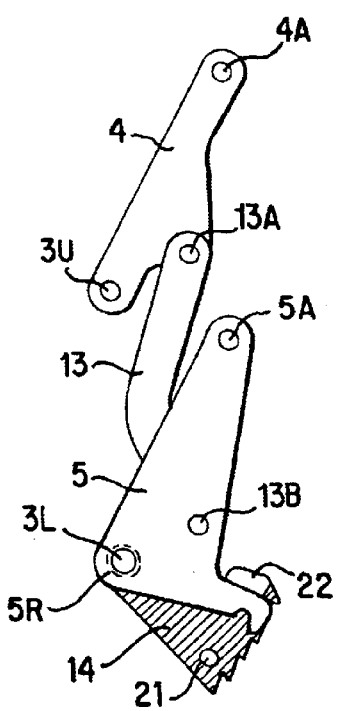
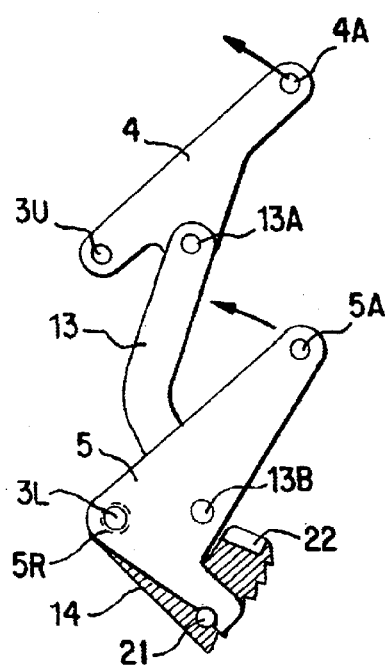
Fig. 4a    Fig. 4b

HEAD RESTRAINT

BACKGROUND AND SUMMARY OF THE INVENTION

This application claims the priority of German Patent Document 100 47 406.3, filed in Germany, Sep. 26, 2001, the disclosure of which is expressly incorporated by reference herein.

The invention relates to a head restraint for a motor vehicle, which has a fixed support part and a movable, prestressed part, which parts are connected to each other via levers.

German Patent Document DE 197 07 998 A1 (corresponding U.S. Pat. No. 6,082,817) discloses a head restraint which has a fixed, rear part and a front, movable part. The two parts are connected to each other via a four-bar pivoting-lever suspension means by means of which the movable part can be transferred from a normal position into a protective position. The protective position is situated higher and further forwards than the normal position. Two different energy stores are provided as the drive for the shifting of the movable part: a flat spiral spring which is triggered by a mass lever and a pyrotechnic drive which is activated by an electric crash signal and engages on the lever system via a Bowden cable. The mass lever responds if an impact lies below a predetermined threshold. The range lying above the threshold is covered by the electric crash signal. In order to support the movable part in the extended position, supporting levers are provided in addition to the levers of the four-bar pivoting-lever suspension means. The movable part can be moved back from the protective position into the normal position via pull cables engaging on these supporting levers.

A disadvantage of this known head restraint is the complicated structure. In addition to the four pivoting levers and the two supporting levers, engagement points for a Bowden cable and cable pulls are also provided between the two parts of the head restraint. Furthermore, a mass element is integrated in the head restraint, for which sufficient space has to be made available to enable it to pivot out and which is triggered relatively slowly because it initially has to cover a certain distance. In addition, two different drive units are provided—the flat spiral spring and pyrotechnic drive—for which in turn two different triggering elements are necessary. If the triggering takes place by means of the pyrotechnic drive, then the safety system in the head restraint is not reversible, that is to say, it has to be renewed after having been triggered.

Added to this is the fact that the triggering of the known head restraint is crash-active, that is to say, it only takes place if there has already been an impact. The time then remaining is generally too short to move the movable part of the head restraint into an effective protective position. This means that the movable part may only take up its protective position when the vehicle occupant's head has already been flung rearwards. When the triggering takes place by the mass element and the drive by means of the flat spiral spring, the time at which the head restraint has taken up the protective position is delayed even further, because a flat spiral spring is relatively slow to trigger the movement of the movable part.

A further disadvantage of the known head restraint resides in the fact that the sequence of movement takes place in an arc from the bottom upwards on account of the arrangement of the levers and their pivoting points in the head restraint. In the case of this sequence of movement, there is the risk of the vehicle occupant's head being pulled rearwards over the head restraint, which considerably increases the risk of injury in the cervical vertebra region.

Against this background, an object of the present invention is to provide a head restraint of the type mentioned at the beginning, in which the movable head-restraint part can be shifted forwards in a simple manner.

This object is achieved according to preferred embodiments of the invention by a head restraint for a motor vehicle which has a fixed support part and a movable, prestressed part, which parts are connected to each other via at least one upper and one lower lever, in which case the movable part can be moved from a normal position into a protective position and vice versa, wherein the levers are arranged parallel to each other, and wherein, in order to prestress the movable part, a spring is provided that engages at its one end on the fixed support part and at its other end directly or indirectly on one of the two levers.

Accordingly, in preferred embodiments the head restraint has a fixed support part and a movable, prestressed part, which parts are connected to each other via at least one upper and one lower lever, in which case the movable part can be moved from a normal position into a protective position and vice versa. Preferred embodiments of the invention are distinguished in that the lower and upper levers are arranged parallel to each other, and in that in order to prestress the movable part a spring is provided that engages at its one end on the fixed support part and at its other end directly or indirectly on one of the levers.

The invention affords the advantage that its construction is simple and the head restraint according to the invention can accordingly be produced in a simple and therefore cost-effective manner. Furthermore, according to an advantageous feature of certain preferred embodiments of the invention the parallel arrangement of at least one upper and one lower lever affords the advantage that the path of movement of the movable part of the head restraint is likewise parallel. This means that the head restraint always retains the same inclination over the path of movement. This ensures that if the vehicle occupant's head comes into contact with the head restraint while the one head-restraint part is being shifted, the head is pushed forwards without changing its inclination. The change in inclination would have the consequence of the head experiencing a change in inclination corresponding to the change in inclination of the head restraint, which would increase the risk of injury in an impact situation.

The use of a spring for applying a prestressing force in the head restraint is particularly favorable because the energy store for driving the movement can thereby be integrated in the head restraint, and complicated connections between an energy store arranged remotely and the head restraint become superfluous. In addition, a triggering mechanism which contains a spring is reversible, in contrast to the pyrotechnic triggering mechanism described in conjunction with the prior art.

Advantageous features of preferred embodiments of the invention can be gathered from the following description and the claims. A spiral spring may, for example, be selected as the energy store, which spiral spring engages at its one end on the fixed support part, for example on a head-restraint bracket, and at its other end on the lower lever. The spring can be locked in its stressed position, in which the head restraint takes up a normal position, via a release lever. In this case, it is possible for the release lever to be held in the normal state via a torsion spring. This specific spring-lever system enables a reversible functioning of the head restraint.

According to a further advantageous feature of preferred embodiments of the invention, the spiral spring engages on one of the levers between the fixed support part and movable part indirectly via a spring lever. This spring lever can be mounted at the same point as the lever on which it engages. In order to produce a carry-along connection between the spring lever and lever, the spring lever can have a carry-along pin via which carrying-along is ensured—as soon as the pin of the spring lever touches the lever. Arranged between the spring lever and the lever on which it engages are, preferably, two shaft rings by means of which infinitely variable adjustability of the head restraint for comfort purposes is made possible. This is because the shaft rings produce a defined stiffness which is sufficient to provide the locking for the described purposes.

In a particularly advantageous manner according to certain preferred embodiments of the invention, the spring lever can have a latching portion which, when the movable part of the head restraint is shifted, interacts with a latching portion of a latching lever. In this manner, pressing-back of the head restraint is prevented both in the end position and in intermediate positions.

The head restraint according to the invention is preferably triggered when a crash is sensed. When crash sensing is referred to in the context of the invention, precrash sensing and contact sensing is meant in particular. The precrash sensing has the advantage that safety measures in and on the vehicle can be initiated prior to any occurring impact, with the result that they have already taken up a safety position at the time of the impact and therefore provide optimum protection for the vehicle occupants.

The crash sensing can interact in an advantageous manner with a triggering device which, according to a further embodiment, is arranged in the head restraint and is fixed to the fixed support part. The triggering device may, for example, be a small magnet which is triggered by an electric pulse of the crash sensing. A small magnet of this type affords the advantage that it is triggered within a few milliseconds after it has received an electric pulse, which ensures that a safety position is taken up in good time.

The triggering device may be arranged in such a manner that it acts on the release lever, the pivoting of which releases the energy store—the spring. On account of the prestressing of the spring, the latter, after it has been released, triggers a movement which transfers the movable part of the head restraint from the normal position into a protective position.

Other objects, advantages and novel features of the present invention will become apparent from the following detailed description of the invention when considered in conjunction with the accompanying drawings.

BRIEF DESCRIPTION OF THE DRAWINGS

FIGS. 3a and 3b cross sections through head restraint of FIG. 1 according to the invention, which cross sections depict the sequence of movement during the resetting of the movable part of the head restraint into a normal position, and FIGS. 4a and 4b show the lever arrangement of the head restraint of FIG. 1 according to the invention in order to explain the comfort adjustment.

DETAILED DESCRIPTION OF THE DRAWINGS

Figure 1:
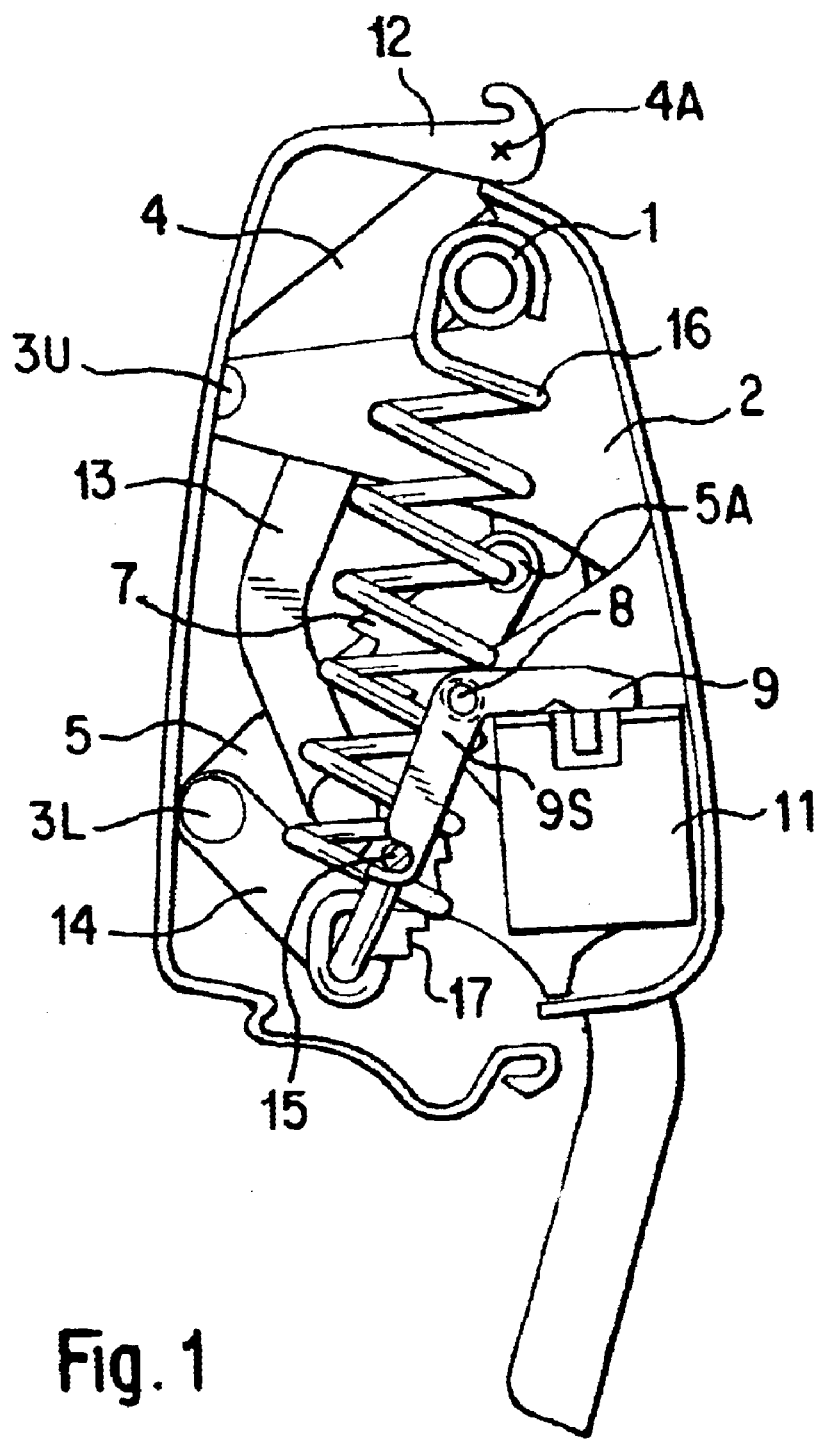
FIG. 1 shows a cross section through a head restraint constructed according to preferred embodiments of the invention.

According to FIG. 1, the head restraint according to the invention comprises two parts, a fixed, rear support part 2 and a movable, front part 12, which parts are connected to each other via levers. The support part 2 is attached to a head-restraint bracket 1. The support part 2 is fixed and points to the rear in the vehicle interior. Bearing points 3U and 3L for upper and lower levers 4, 5 are provided on the front side of the support part 2. In the exemplary embodiment illustrated, two levers 4, 5—a lower lever and an upper lever—are in each case arranged on each side of the head restraint, just one pair of said levers being illustrated in the sectional illustration. Accordingly, the rear support part 2 of the embodiment illustrated has four bearing points 3U, 3L. This arrangement ensures a particularly stable sequence of movement. In the following text, only one side of the head restraint having one upper lever 4 and one lower lever 5 will be described, since both sides are of identical construction. This is stressed only in those regions in which there is a connection between the two sides.

Figure 2A:
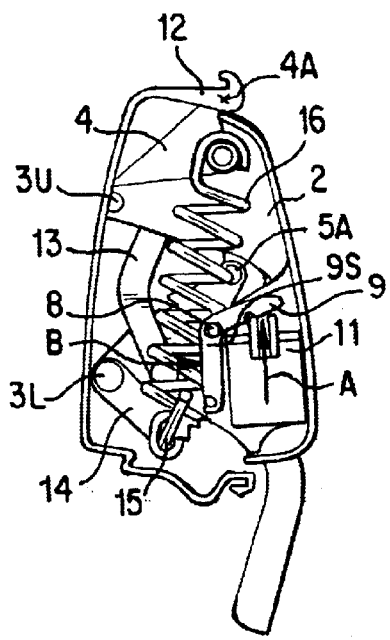
FIGS. 2a to 2c show cross sections through the head restraint of FIG. 1 according to the invention, which cross sections depict the sequence of movement during the transfer of the movable part of the head restraint into a protective position.
Figure 2B:
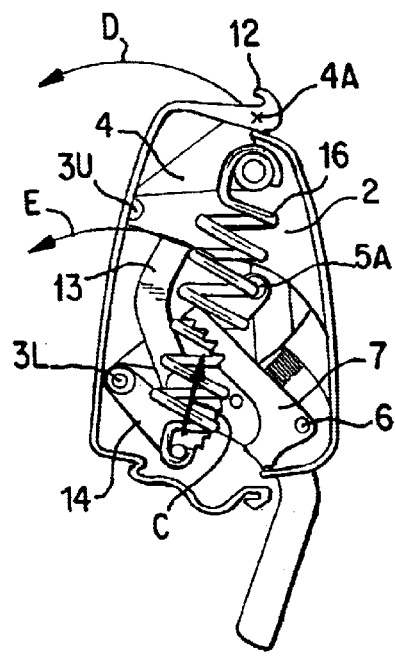
Figure 2C:
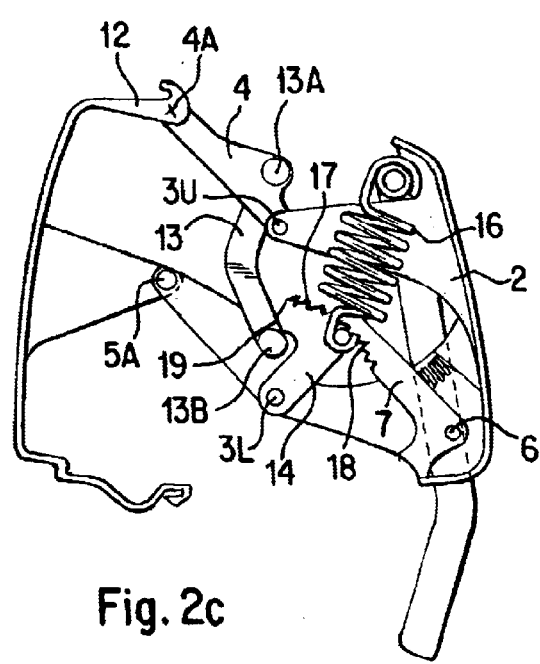

Furthermore, a bearing point 6—which cannot be seen in FIG. 1, but shown in FIGS. 2b and 2c—for a latching lever 7 is provided on the front side of the support part 2. The function of the latching lever 7 will be explained in greater detail further on. The support part 2 also has a bearing point 8 for a release lever 9, which will likewise also be described in greater detail.

The lower and upper levers 4, 5 connect the support part 2 to the movable part 12 of the head restraint at respective pivot points 4A, 5A, which part 2 is orientated forwards towards the vehicle occupant's head. The levers 4 and 5 are arranged parallel to each other. This arrangement ensures that the path of movement of the front part 12 when triggering occurs is parallel. This means that the front part 12 is moved forwards without changing its inclination. The levers 4, 5 are connected to each other in each case via connecting levers 13 at pivot points 13A, 13B by means of which a movement of the one lever is passed on to the other lever.

A spring lever 14 is mounted pivotably in the same bearing point 3L as the lower lever 5. In the exemplary embodiment illustrated, the spring levers 14 on both sides of the head restraint are connected to each other via a spring rod 15. The spring rod 15 is illustrated sectioned in FIG. 1. The spring rod 15 serves, among other things, to synchronize the movements of the lever systems arranged on both sides of the head restraint.

The spring lever 14 has a carry-along pin 21 (not illustrated in FIG. 1, see FIGS. 4a and 4b) via which the lower lever 5 is pivoted about the bearing point 3 L during a movement of the spring lever 14. At that end of the spring lever 14 which faces away from the bearing, said spring lever is connected to a spiral spring 16 which is fixed at its upper end to the fixed head-restraint bracket 1. In the normal position of the head restraint, the spring 16 is stressed between the head-restraint bracket 1 and the spring lever 14. The release lever 9, which is mounted in the bearing point 8 on the support part 2, locks the spring lever 14 and is held in the normal state by a torsion spring 9S. In order to lock the spring lever 14, the release lever 9 grips around the spring rod 15 which interacts with the spring lever 14. Thus, in addition to synchronizing the movement of the spring levers 14 arranged on the right and left of the head restraint, the spring rod 15 also takes over the locking of the said spring levers in the prestressed position.

In addition, a triggering device 11, for example a small magnet, is attached to the support part 2. The triggering device 11 is arranged in such a manner that, when actuated, it acts upon the release lever 9 and pivots the latter in such a manner that it releases the spring rod 15 and, together with the latter, the spring lever 14.

The function of the crash triggering will be explained in greater detail in the following text with reference to FIGS. 2a to 2c. The triggering device 11, which is illustrated only in FIG. 2a, is actuated by an electric pulse of a sensing means. The sensing means provided is preferably a precrash sensing means which is distinguished in that it registers an accident which is probably going to occur and thereupon passes on a corresponding pulse. The triggering device 11 then pivots the release lever 9 about its bearing point 8 counter to the spring force of the torsion spring 9S. In FIG. 2a, this movement is indicated by the arrows A and B.

The release lever 9, which is in the form of a tilting lever, now releases the spring rod 15 which is connected to the prestressed spring levers 14 arranged on both sides. The spring 16 then pivots the spring levers 14 about their bearing points 3U. This movement is indicated by the arrow C in FIG. 2b. By means of the carry-along pin 21 on the spring lever 14, the lower lever 5 is rotated at the same time about the bearing point 3L. The connecting lever 13 passes on the movement to the upper lever 4 and therefore enables the front part 12 of the head restraint to move. The head restraint moves parallel, i.e. without any change in inclination, forwards along a curved path (cf. arrows D and E).

The spring lever 14 is provided with a latching portion 17. During the movement of the front part 12 of the head restraint this latching portion 17 slips along a corresponding latching portion 18 on the latching lever 7. This prevents shifting back of the extended part 12 of the head restraint both in the end position and in intermediate positions. The path of the movable part 12 of the head restraint is limited by the spring lever 14 striking against the connecting lever 13. This connecting point between the spring lever 14 and the connecting lever 13 is indicated in FIG. 2c by the reference number 19.

As illustrated in FIGS. 3a and 3b, after a crash triggering, the movable part 12 of the head restraint can be pressed back by manual release in the direction of the arrow F of the latching lever 7, for example via a push-button (indicated by the arrow G in FIG. 3a), and therefore release of the latching between the latching lever 7 and the spring lever 14 (arrow H in FIG. 3a). The release lever 9, which is prestressed via the torsion spring 9S, then snaps back into the spring rod 15 (arrows I and K in FIG. 3b) and locks the latter. As soon as this has taken place, the movable part 12 of the head restraint resumes its normal position. This makes possible a reversible functioning of the head restraint which affords the advantage that the head restraint does not have to be exchanged once it has been triggered.

The crash-triggering function which has just been described is independent of the comfort setting of the head restraint, which setting is described in the following text in conjunction with FIGS. 4a and 4b. In the normal position, the spring lever 14 is locked by the release lever 9. Lower and upper levers 4, 5 are mounted movably at the bearing points 3L, 3U, so that in principle an adjustment of the front part of the head restraint is possible. In the exemplary embodiment illustrated, infinitely variable adjustment is realized by a defined stiffness, for example by means of two shaft rings SR (FIGS. 4a and 4b) between the lower lever 5 and the locked spring lever 14. The manual range of adjustment is limited by limiting the angle of rotation of the lower lever 5 via carry-along pins 21 and a stop 22 on the locked spring lever 14. In FIGS. 4a and 4b, the two extreme positions are illustrated in which the lever 5 bears in each case on the carry-along pin 21 or on the stop 22. FIG. 4a shows the uppermost position of the movable part 12 and FIG. 4b shows the lowermost position thereof. For clarification purposes, the locked and therefore fixed spring levers 14 are illustrated by hatching. There is no latching portion in the comfort-adjustment region. However, this is also possible according to other contemplated arrangements.

With the aid of the arrangement which has been described above, it is possible, in the case of a head restraint of the type mentioned at the beginning, to carry out a crash-sensed forward shifting of the movable part 12 of the head restraint in a reversible manner and at the same time to make available a comfort-setting option for the head restraint.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed:

1. Head restraint for a motor vehicle, which has a fixed support part and a movable, prestressed part, which parts are connected to each other via at least one upper and one lower lever, in which case the movable part can be moved from a normal position into a protective position and vice versa,
    wherein the levers are arranged parallel to each other,
    wherein, in order to prestress the movable part a spring is provided that engages at one end on the fixed support part and at another end at least indirectly on one of the two levers, and
    wherein a connecting lever is provided between the upper and the lower lever.

2. Head restraint for a motor vehicle, which has a fixed support part and a movable, prestressed part, which parts are connected to each other via at least one upper and one lower lever, in which case the movable part can be moved from a normal position into a protective position and vice versa,
    wherein the levers are arranged parallel to each other,
    wherein, in order to prestress the movable part a spring is provided that engages at one end on the fixed support part and at another end at least indirectly on one of the two levers, and
    wherein the spring engages at one end on a fixed head-restraint bracket and at other end on the lower lever.

3. Head restraint according to claim 2, wherein the spring is a spiral spring.

4. Head restraint according to claim 2,
    wherein the spring is locked in a stressed position via a release lever in the normal position.

5. Head restraint according to claim 1, wherein the spring is a spiral spring.

6. Head restraint for a motor vehicle, which has a fixed support part and a movable, prestressed part, which parts are connected to each other via at least one upper and one lower lever, in which case the movable part can be moved from a normal position into a protective position and vice versa, wherein the levers are arranged parallel to each other, wherein, in order to prestress the movable part a spring is provided that engages at one end on the fixed support part and at another end at least indirectly on one of the two levers, and wherein the spring is locked in a stressed position via a release lever in the normal position.

7. Head restraint according to claim 6, wherein the release lever is held in the normal position via a torsion spring which counteracts the force of the spring.

8. Head restraint according to claim 6, wherein a triggering device is fixed to the support part, said triggering device being operable to trigger movement of the movable part to the protective position utilizing forces from the spring, and wherein the triggering device acts upon the release lever.

9. Head restraint according to claim 8, wherein the triggering device is a small magnet.

10. Head restraint according to claim 8, wherein the triggering device is triggered by an electric pulse of a crash sensor.

11. Head restraint for a motor vehicle, which has a fixed support part and a movable, prestressed part, which parts are connected to each other via at least one upper and one lower lever, in which case the movable part can be moved from a normal position into a protective position and vice versa, wherein the levers are arranged parallel to each other, wherein, in order to prestress the movable part a spring is provided that engages at one end on the fixed support part and at another end at least indirectly on one of the two levers, and wherein the spring engages on one of the levers via a spring lever.

12. Head restraint according to claim 11, wherein the spring lever is mounted at a same bearing point as the lever on which the spring lever engages.

13. Head restraint according to claim 11, wherein two shaft rings are arranged between the spring lever and the lever on which the spring lever engages.

14. Head restraint according to claim 12, wherein the spring lever has a carry-along pin via which the spring lever carries along the lever on which the spring lever engages during a pivoting movement about the bearing point.

15. Head restraint according to claim 12, wherein the spring lever has a latching portion which, when the movable part of the head restraint is shifted, interacts with a latching portion of a latching lever.

16. Head restraint according to claim 11, wherein the spring lever has a carry-along pin via which the spring lever carries along the lever on which the spring lever engages during a pivoting movement about a bearing point.

17. Head restraint according to claim 16, wherein the spring lever has a latching portion which, when the movable part of the head restraint is shifted, interacts with a latching portion of a latching lever.

18. Head restraint according to claim 16, wherein two shaft rings are arranged between the spring lever and the lever on which the spring lever engages.

19. Head restraint according to claim 11, wherein the spring lever has a latching portion which, when the movable part of the head restraint is shifted, interacts with a latching portion of a latching lever.

20. Head restraint according to claim 1, wherein the movement of the movable part from the normal position into the protective position is triggered when a crash is sensed.

21. Head restraint according to claim 1, wherein a triggering device is fixed to the support part, said triggering device being operable to trigger movement of the movable part to the protective position utilizing forces from the spring.

22. Head restraint according to claim 21, wherein the triggering device is a small magnet.

23. Head restraint according to claim 22, wherein the triggering device is triggered by an electric pulse of a crash sensor.

24. Head restraint according to claim 21, wherein the triggering device is triggered by an electric pulse of a crash sensor.

25. A motor vehicle head restraint assembly comprising:

a fixed support part, a movable part engageable in use with a vehicle occupant head region, an upper lever connected to the movable part and pivotally connected to the fixed support part at a first position spaced from the movable part, a lower lever connected to the movable part and pivotally connected to the fixed support part at a second position spaced from the movable part and the movable part, a spring interposed between the fixed support part and said levers, a selectively releasable latching mechanism operable to hold said spring in a prestressed condition with said levers holding the movable part in a normal driving position, and a collision condition actuable release mechanism operable to release the latching mechanism with consequent automatic forcing of said levers to move the movable part from the normal driving position, and wherein a connecting lever is provided between the upper and the lower lever.

26. A motor vehicle head restraint assembly, according to claim 25, wherein said upper lever and lower lever are disposed parallel to one another and disposed to maintain a substantially constant angular orientation of the movable part during movement thereof between the normal position and the protective position.

27. A motor vehicle head restraint assembly according to claim 26, wherein said levers and release mechanism are configured to accommodate manual movement of the moveable part from the protective position to the normal position against spring forces of the spring without damaging the head restraint assembly.

28. A motor vehicle head restraint assembly according to claim 25, wherein said spring is a coil spring.

29. A motor vehicle head restraint assembly according to claim 25, wherein one end of said spring is fixed to said fixed support part and an opposite end of said spring is operatively engageable with said lower lever.

30. Head restraint according to claim 29, wherein the spring is locked in a stressed position via a release lever in the normal position.

31. Head restraint according to claim 30,
wherein the release lever is held in the normal position via a torsion spring which counteracts the force of the spring.

32. Head restraint according to claim 30,
wherein the spring engages on one of the levers via a spring lever.

33. Head restraint according to claim 32,
wherein the spring lever is mounted at a same bearing point as the lever on which the spring lever engages.

* * * * *